US007460127B2

(12) United States Patent
Yamazaki

(10) Patent No.: US 7,460,127 B2
(45) Date of Patent: Dec. 2, 2008

(54) DISPLAY CONTROL CIRCUIT

(75) Inventor: Hiroyuki Yamazaki, Tenri (JP)

(73) Assignee: Sharp Kabushiki Kaisha, Osaka (JP)

( * ) Notice: Subject to any disclaimer, the term of this patent is extended or adjusted under 35 U.S.C. 154(b) by 585 days.

(21) Appl. No.: 11/099,533

(22) Filed: Apr. 6, 2005

(65) Prior Publication Data

US 2005/0225542 A1 Oct. 13, 2005

(30) Foreign Application Priority Data

Apr. 7, 2004 (JP) ............................ 2004-112890

(51) Int. Cl.

| | |
|---|---|
| ***G09G 5/00*** | (2006.01) |
| ***G09G 3/32*** | (2006.01) |
| ***G06F 3/038*** | (2006.01) |
| ***G06F 12/00*** | (2006.01) |
| ***G06F 13/00*** | (2006.01) |
| ***G06F 13/28*** | (2006.01) |
| ***G06T 1/60*** | (2006.01) |
| ***H04N 17/00*** | (2006.01) |
| ***H04N 17/02*** | (2006.01) |
| ***G11B 5/02*** | (2006.01) |
| ***G11B 5/10*** | (2006.01) |
| ***G11B 23/20*** | (2006.01) |

(52) U.S. Cl. ......................... 345/530; 345/1.1; 345/87; 345/89; 345/204; 345/214; 345/638; 348/177; 348/178; 369/292; 711/106

(58) Field of Classification Search .................. 345/87, 345/204, 214, 530, 638, 1.1, 89; 348/177, 348/178, 179, 565, 578, 576, 588, 589, 600, 348/601, 625; 710/15, 16, 17, 18, 19, 22, 710/23, 24, 25, 26, 27, 28; 711/100–173; 369/292

See application file for complete search history.

(56) References Cited

U.S. PATENT DOCUMENTS

| | | | | |
|---|---|---|---|---|
| 5,958,025 | A * | 9/1999 | Sonobe ........................ | 710/27 |
| 6,362,816 | B1 * | 3/2002 | Kawanami et al. .......... | 345/214 |
| 2002/0033900 | A1 * | 3/2002 | Honma et al. ............... | 348/581 |
| 2002/0180675 | A1 * | 12/2002 | Tobita et al. .................. | 345/87 |

FOREIGN PATENT DOCUMENTS

| | | |
|---|---|---|
| JP | 61-208553 | 9/1986 |
| JP | 63234316 | 9/1988 |
| JP | 8-6546 | 1/1996 |
| JP | 2003288202 | 10/2003 |

* cited by examiner

*Primary Examiner*—Ulka Chauhan
*Assistant Examiner*—Aaron M Guertin
(74) *Attorney, Agent, or Firm*—Harness, Dickey & Pierce, PLC

(57) ABSTRACT

A display control circuit incorporating a RAM in which display data is stored, comprises an oscillation circuit which oscillates a reference clock to define a transfer period in which the display data is transferred from the RAM to a display and a counter circuit which counts the number of the reference clocks, and the transfer period is determined by the number of counts of the reference clocks by the counter circuit. In addition, the oscillation circuit starts oscillation when a transfer request of the display data is generated while the oscillation is stopped, and stops the oscillation when an access request from the CPU is generated during the oscillation, and resumes the oscillation when the access request is stopped.

6 Claims, 4 Drawing Sheets

DISPLAY CONTROL CIRCUIT

CROSS REFERENCE TO RELATED APPLICATTION

This Nonprovisional application claims priority under 35 U.S.C. §119(a) on Patent Application No. 2004-112890 filed in Japan on Apr. 7, 2004, the entire contents of which are hereby incorporated by reference.

BACKGROUND OF THE INVENTION

1. Field of the Invention

The present invention relates to a display control circuit which controls transfer of display data from a random access memory (RAM) in which the display data is stored to a display and more particularly, it relates to a display control circuit which prevents conflict between a write/read operation of the display data by a CPU and a transfer operation of the display data from a single port RAM to a display in a display circuit which stores the display data in the single port RAM and displays the data.

2. Description of the Related Art

The single port RAM is incorporated and when the display data is written on/read from the single port RAM by the CPU and the display data is transferred from the single port RAM to a display panel (display), the display data could be destroyed because of conflict between a write/read command and a command of display read. In order to prevent the data from being destroyed because of conflict, various kinds of measures have been taken. For example, Japanese Unexamined Patent Publication No. 63-234316 discloses a method of controlling validation and invalidation of access by providing an access judgment circuit, and a method of determining an object which can be accessed in a predetermined period. In addition, Japanese Unexamined Patent Publication No. 2003-288202 discloses a method of stopping an access from the CPU by providing a flag while display data is read, and an internal synchronization circuit to improve a defect in which a cycle time between a write/read process and a display data read process becomes long.

According to the method disclosed in the Japanese Unexamined Patent Publication No. 63-234316 and the conventional circuit disclosed in the Japanese Unexamined Patent Publication No. 2003-288202, the access from the CPU is stopped while the reading period of the display data to prevent the processes from conflicting. According to this method, as stated in the Japanese Unexamined Patent Publication No. 2003-288202, there are problems in which a control load on the side of the CPU is increased, and a cycle time of the transfer of the display data through the RAM becomes long.

The Japanese Unexamined Patent Publication No. 2003-288202 discloses a circuit in which the access from the CPU has priority by stopping a reading request of the display data.

According to the Japanese Unexamined Patent Publication No. 2003-288202, when the access from the CPU is generated while the reading of the display data is requested, a flag to determine whether the read of the display data is completed or not is needed, so that a delay circuit and the like is needed to form the flag, which complicates the circuit. In addition, when a circuit to determine a period of reading the display data comprises only the delay circuit, since a delay time depends on a difference or variation in manufacturing condition, it is necessary to confirm that there is no problem in a circuit operation in a case where a process condition is changed because, for example, a factory is changed, and it is necessary to change and design again the number of stages of the delay circuit, a transistor size and the like in some cases.

SUMMARY OF THE INVENTION

The present invention has been made in view of the above problems and it is an object of the present invention to provide a display control circuit which prevents conflict between a transfer process of display data from a random access memory in which the display data is stored to a display, and a writing/reading process of the display data by the CPU without being affected by a difference or variation in manufacturing condition.

The present invention to attain the above object is characterized in a constitution in which a display control circuit incorporating a random access memory in which display data is stored, comprises an oscillation circuit which oscillates a reference clock to define a transfer period in which the display data is transferred from the random access memory to a display, and a counter circuit which counts the number of the reference clocks, and the transfer period is determined by the number of counts of the reference clocks by the counter circuit.

In addition, according to the display control circuit of the present invention, the oscillation circuit starts oscillation when a transfer request of the display data from the random access memory to the display is generated while the oscillation is stopped, and stops the oscillation when an access request to the random access memory from the CPU is generated during the oscillation, and resumes oscillation when the access request is stopped.

According to the present invention having the above constitution, since a transfer period required for reading the display data from the random access memory and transferring it to the display is determined by the number of reference clocks, counted by the counter circuit, oscillated by the incorporated oscillation circuit, the transfer period can be ensured by a circuit operation on logic. That is, even when a circuit delay time is changed because an access time to the random access memory is changed depending on a manufacturing condition or a change in operation voltage, since the same circuit delay is generated in the oscillation circuit and the cycle of the reference clock is changed, so that the transfer period is relatively changed. As a result, the transfer period can be ensured.

Furthermore, since the oscillation circuit starts the oscillation when the transfer request of the display data from the random access memory to the display is generated while the oscillation is stopped, if there is no access request to the random access memory from the CPU, the transfer period is started with the transfer request and the transfer of the display data can be completed in the transfer period. In addition, since the oscillation circuit stops the oscillation when the access request to the random access memory is generated from the CPU during the oscillation and resumes oscillation again when the access request is stopped, in a case where the access from the CPU is generated while the transfer of the display data is requested, the access of the CPU can have priority and the transfer period is automatically started to transfer the display data after the access from the CPU is completed. As a result, it is not necessary to confirm the completion of the display data transfer by the CPU, so that the circuit constitution can be simplified and the control load on the side of the CPU can be reduced.

DESCRIPTION OF PREFERRED EMBODIMENTS

An embodiment of a display control circuit according to the present invention (referred to as "the circuit of the present invention" occasionally hereinafter) will be described with reference to the drawings.

Figure 1:
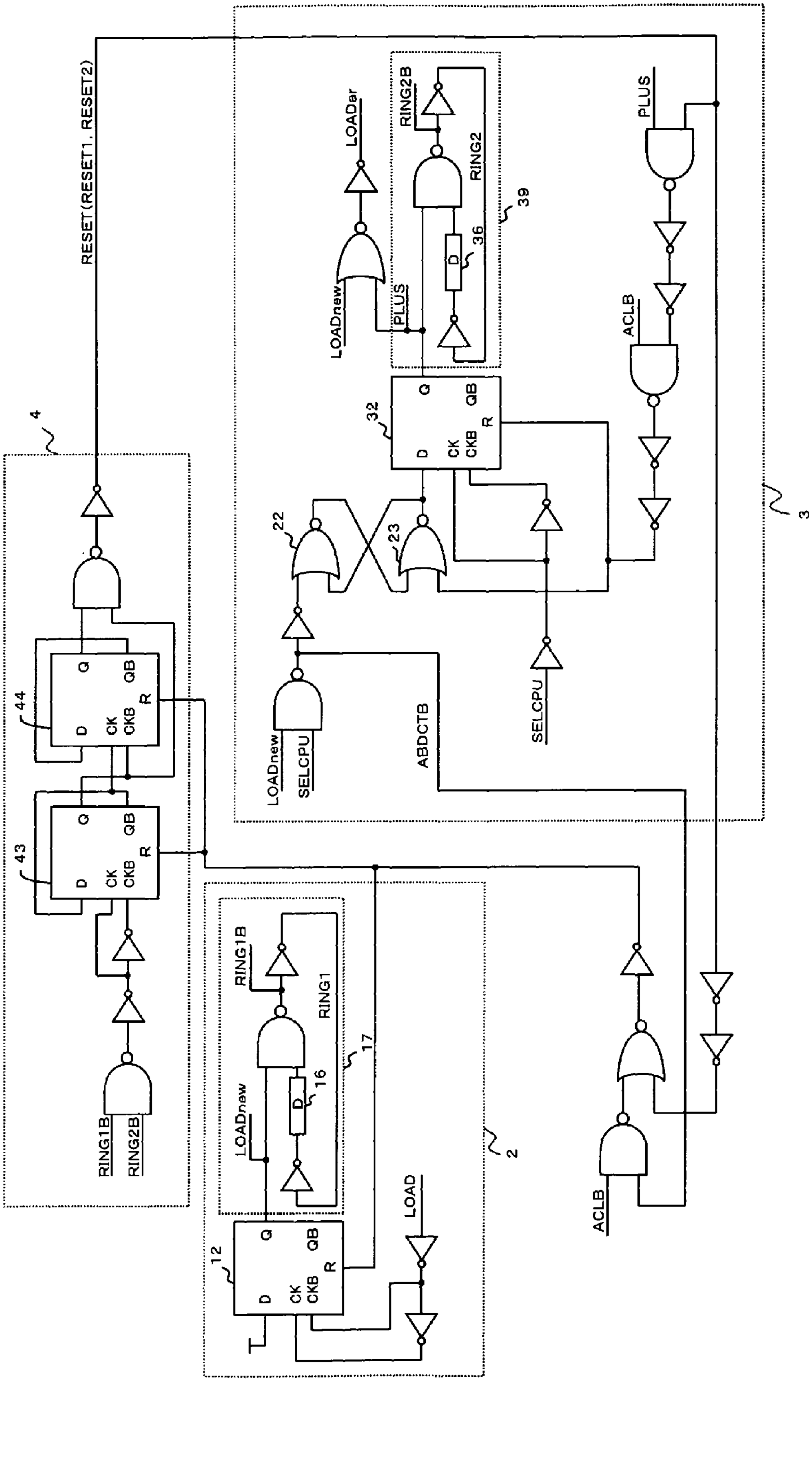
FIG. 1 is a logic circuit diagram showing an example of an essential circuit constitution in an embodiment of a display control circuit according to the present invention.

FIG. 1 shows an example of a control circuit part 1 of the circuit of the present invention. As shown in FIG. 1, the control circuit part 1 comprises three circuit blocks 2 to 4 and outputs a transfer command signal LOADar to define a transfer period in which display data is read from a random access memory (referred to as "the display RAM" (not shown) hereinafter) which stores the display data and is transferred to a display (not shown). Among the three circuit blocks 2 to 4, the first circuit block 2 comprises a first oscillation circuit 17 which oscillates first reference clocks RING1 and RING1B, the second circuit block 3 comprises a second oscillation circuit 39 which oscillates second reference clocks RING2 and RING2B, and generates the transfer command signal LOADar, and the third circuit block 4 constitutes a counter circuit which counts the number of the first or the second reference clock RING1B or RING2B.

When a character "B" is allotted to the end of a signal name in FIG. 1, it means that the signal becomes active during "L" (low level) period, and when signals have the same signal names with "B" and without "B" at the end of their names, it means that the signal levels of the signals are in a reversal relation, for example, the first reference clocks RING1 and RING1B.

Three input signals LOAD, SELCPU, and ACLB are input from the outside to the control circuit part 1. The signal LOAD is a read request signal of the display data (a transfer request signal from the RAM to the display), and the signal SELCPU is an access request signal by the CPU. When their input levels are in "H" (high level) periods, their requests are effective, that is, they are in access periods. The signal ACLB is a reset signal for the whole of the control circuit part 1 and when the signal is in "L" (low level) period, the circuit blocks 2 to 4 are reset.

In addition, logic circuits designated by reference numerals 12, 32, 43 and 44 in FIG. 1 are D-type flip-flops each of which latches an input signal value to a data input terminal D at a rising timing of an input signal to a clock terminal CK and outputs latched data from a data output terminal Q. From a data output terminal QB, an inversion signal of the output signal to be outputted from the data output terminal Q is outputted. When an "H" signal is inputted to a reset terminal R, latching of the inputted data is reset and the output from the data output terminal Q becomes "L" (low level).

Each of the first and second oscillation circuits 17 and 39 comprises a ring oscillator. Circuits 16 and 36 which are provided in the first and second oscillation circuits 17 and 39 respectively are delay circuits comprising inverter circuits which are connected in even stages in a vertical column. These circuits are provided to adjust oscillation cycles of the oscillation circuits 17 and 39.

Figure 3:
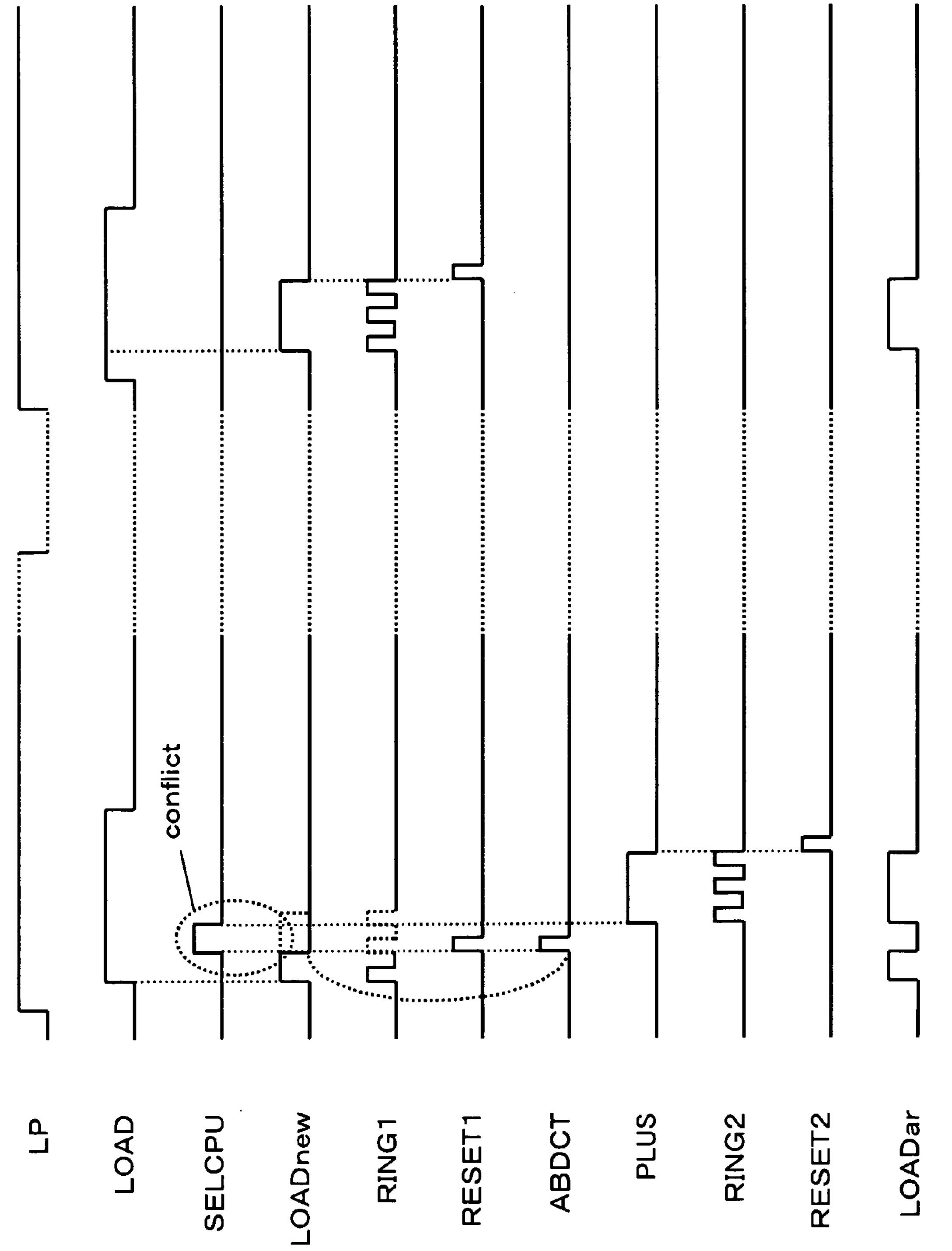
FIG. 3 is a timing chart showing an operation timing according to the embodiment of the display control circuit of the present invention.
Figure 4:
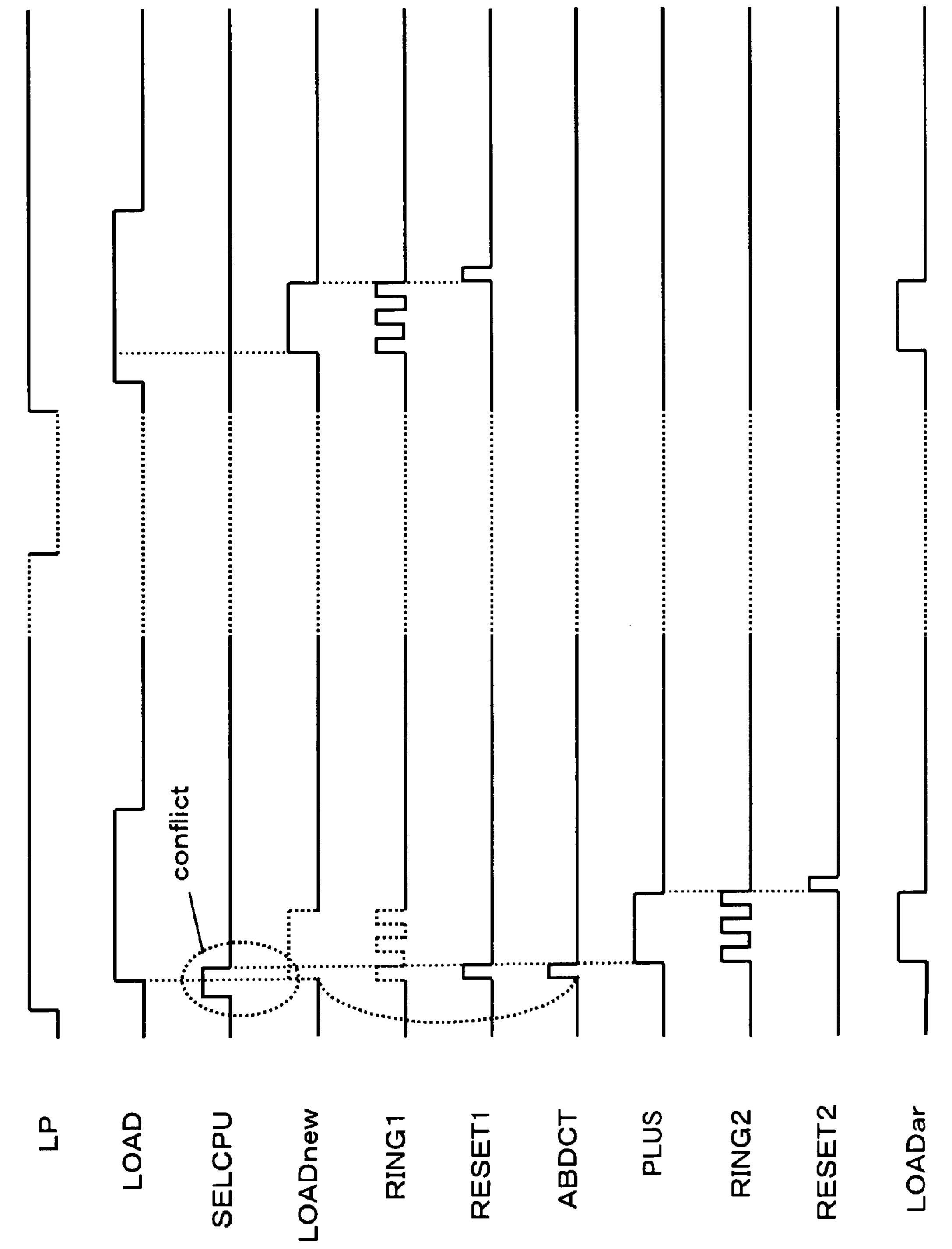
FIG. 4 is a timing chart showing operation timing according to the embodiment of the display control circuit of the present invention.

An operation of the control circuit part 1 of the circuit of the present invention will be described with reference to timing charts shown in FIGS. 2 to 4.

First, referring to FIG. 2, a summary of the control circuit part 1 will be described, assuming that there is no conflict between the transfer request of the display data and the access request from the CPU. In addition, in FIGS. 2 to 4, reference character LP designates a signal based on a horizontal synchronizing signal in a liquid display, for example, and an "H" period of the signal LP shows a display period of one horizontal line. When the signal LOAD rises, the flip-flop 12 of the first circuit block 2 latches input data at the "H" level and a signal LOADnew which is an internal signal becomes "H". When the signal LOADnew becomes "H", the first oscillation circuit 17 (ring oscillator circuit) becomes effective and starts the oscillation. When the third circuit block 4 counts three pulses of the RING1, the signal RESET1 becomes "H" and then the flip-flops 12, 43 and 44 of the first and third circuit blocks 2 and 4 are reset. As a result, the signal LOADnew becomes "L" and the oscillation of the first oscillation circuit 17 is stopped. The signal RESET1 is a RESET signal which is outputted from the third circuit block 4 based on the first reference clock RING1B.

Figure 2:
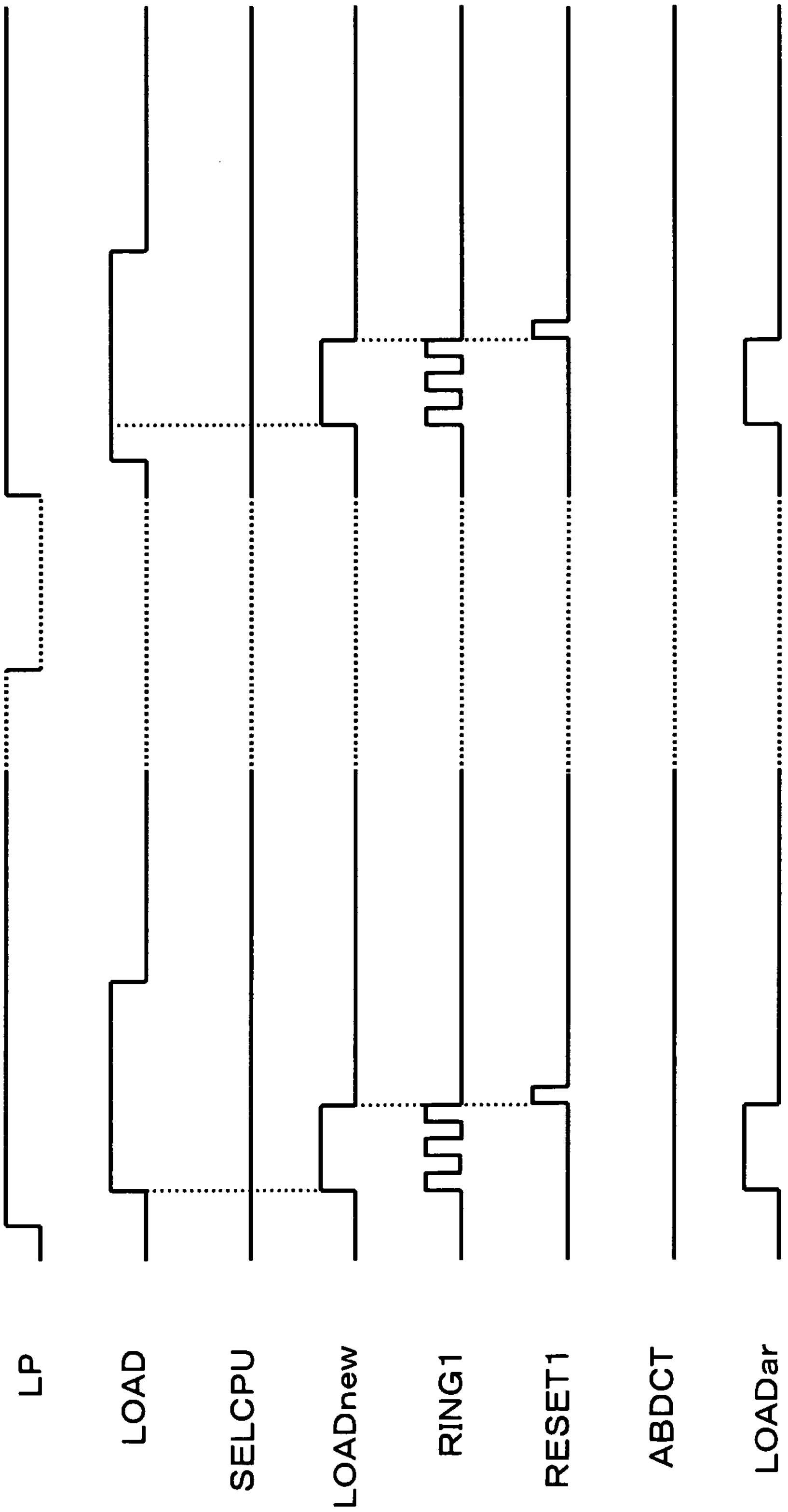
FIG. 2 is a timing chart showing operation timing according to the embodiment of the display control circuit of the present invention.

In the case shown in FIG. 2, since there is no access request from the CPU and the signal SELCPU remains at "L", the flip-flop 32 of the second circuit block 3 is not operated and the signal LOADar has the same waveform as that of the signal LOADnew. A transistor size and the number of stages and the like in the delay circuit 16 are adjusted such that the reading (transfer) of the display data from the display RAM is completed while the signal LOADar is in the "H" period.

Since the control circuit part 1 shown in FIG. 1 counts the oscillation cycles of the first oscillation circuit 17 and sets the "H" period of the signal LOADar (corresponding to the transfer period of the display data), the period for counting the three reference clocks can be surely ensured even when a delay time due to a variation in power supply voltage and the like is changed, so that the operation is not logically changed. However, since the oscillation cycle of the reference clock is generated by the ring oscillator using the delay circuit, the oscillation cycle is varied according to a change in delay time of the delay circuits 16 and 36.

Since the control circuit part 1 shown in FIG. 1 is formed on the same semiconductor substrate as that of the display RAM (not shown), the display RAM and the control circuit part 1 are manufactured in the same manufacturing step. Since the "H" period of the signal LOADar is determined by counting the oscillation cycles of the first or the second oscillation circuit 17 or 39, when a transistor operation of the display RAM is delayed, the operations of the oscillation circuits 17 and 39 comprising the delay circuits 16 and 36, respectively are also delayed, so that the "H" period of the signal LOADar becomes long when a transfer speed of the display RAM is lowered. As a result, a reading error can be prevented.

Next, a conflict avoiding operation when the access request from the CPU is generated while the transfer of the display data is requested will be described with reference to FIG. 3.

When the signal LOAD rises, the flip-flop 12 of the first circuit block 2 latches the "H" level, and the signal LOADnew becomes "H". When the signal LOADnew becomes "H", although the first oscillation circuit 17 (ring oscillator circuit) becomes effective and starts the oscillation, the access request from the CPU is generated and the signal SELCPU becomes "H" before the counting operation by the counter circuit in the third circuit block 4 is completed. Thus, a signal ABDCT which is an AND signal of the signal LOADnew which shows a conflict detection state and the signal SELCPU becomes "H", the flip-flops 43 and 44 of the first and third circuit blocks 2 and 4 are reset, respectively, and the signals LOADnew and LOADar become "L" and the reading (transfer) from the display RAM is stopped. As a result, only the CPU access is effective and the conflict can be avoided. In addition, a signal ABDCTB which is a NAND signal of the signal LOADnew and the signal SELCPU is generated in the second circuit block 3, and the ABDCT signal does not become "H" but the signal ABDCTB becomes "L" instead in FIG. 1. Both are totally equivalent operations logically, and since the reset operations of the flip-flops 12, 43 and 44 are performed by the signal which becomes active at the "H" level, a description will be made using the signal ABDCT because of simplicity of the description.

When the signal ABDCT becomes "H", an output of a NOR circuit 23 of a latch circuit comprising two NOR circuits 22 and 23 at a previous stage of a data input terminal D of the flip-flop 32 of the second circuit block 3 is latched at "H", and when the signal SELCPU falls, the flip-flop 32 of the second circuit block 3 is operated. Thus, a signal PLUS which is an output signal from the data output terminal Q becomes "H" and the second oscillation circuit 39 of the second circuit block 3 starts oscillation. That is, the second circuit block 3 is a circuit which starts an operation after the access request from the CPU is completed. The oscillation clock (second reference clock) of the second circuit block 3 is counted in the third circuit block 4 in the same manner as the description in FIG. 2, so that after three clocks are counted, a signal RESET2 becomes "H" and, then the flip-flops in the first, second and third circuit blocks 2, 3, and 4 are reset. Therefore, the signal PLUS becomes also "L", and the "H" period of the signal LOADar is completed. The signal RESET2 is a RESET signal which is outputted from the third circuit block 4 based on the second reference clock RING2B.

By constituting the delay circuit 36 of the second circuit block 3 in the same manner as the delay circuit 16 of the first circuit block 2, the transfer period of the display data generated in the first circuit block 2 becomes equal to the transfer period of the display data generated in the second circuit block 3. Since the first "H" period of the signal LOADar generated in the first circuit block 2 was interrupted by the access request from the CPU, there is a possibility in which the transfer of the display data is not completed. However, since the transfer (reading operation) of the display data in the display RAM is started from the beginning in the second "H" period of the signal LOADar generated in the second circuit block 3, the transfer period of the display data can be ensured and the transfer of the display data to the display can be surely completed.

As described above, according to the control circuit part 1 of the circuit of the present invention, when the access request of the CPU is generated while the transfer of the display data is requested, since the transfer operation of the display data is interrupted, the conflict can be avoided. Thus, after the access request of the CPU is completed, the display data can be transferred again.

Next, a description will be made of a case where the transfer request of the display data is generated while the access is requested from the CPU with reference to FIG. 4.

When the signal LOAD rises, the flip-flop 12 of the first circuit block 2 latches the "H" level, and the signal LOADnew becomes "H". However, since the signal SELCPU is at "H", the signal ABDCT becomes "H" immediately and the flip-flops 12, 43 and 44 of the first and the third circuit blocks 2 and 4 are reset. Thus, although the signal LOADnew and the signal LOADar become "H" once, they become "L" immediately. As a result, the conflict can be avoided.

When the access request from the CPU is completed, the signal SELCPU falls and the second circuit block 3 starts the operation. Similar to the operation after the conflict is avoided (the completion of the access request from the CPU) in the description made with reference to FIG. 3, the flip-flop 32 of the second circuit block 3 operates so that the signal PLUS becomes "H" and the second oscillation circuit 39 in the second circuit block 3 starts the oscillation. The oscillation clock (second reference clock) of the second circuit block 3 is counted in the counter circuit in the third circuit block 4. After three clocks are counted and the signal RESET2 becomes "H", all of the flip-flops 12, 32, 43, and 44 of the first circuit block 2, the second circuit block 3 and the third circuit block 4 are reset. Thus, the signal PLUS becomes "L" and the signal LOADar becomes "L", so that the transfer period (the "H" period of the signal LOADar) is completed.

As described above, according to the control circuit part 1 of the circuit of the present invention, even when the transfer request of the display data is generated while the access is requested from the CPU, the conflict is avoided, and after the access request of the CPU is completed, the display data can be transferred again.

According to this embodiment, the control circuit part 1 of the circuit of the present invention comprises the three circuit blocks, and the first circuit block 2 comprises the first oscillation circuit 17 which starts the oscillation when the transfer request of the display data from the display RAM to the display is generated while the oscillation is stopped, and stops the oscillation when the access request is generated from the CPU or when the counter circuit counts the predetermined number of the first reference clocks (three in this embodiment) during the oscillation, and the second circuit block 3 comprises the second oscillation circuit 39 which starts the oscillation when the access request from the CPU is canceled (stopped) while the oscillation is stopped, and stops the oscillation when the counter circuit counts the predetermined number of the second reference clocks during the oscillation. However, the functions of the first oscillation circuit 17 and the second oscillation circuit 39 may be integrated. That is, one oscillation circuit may start the oscillation when it receives the transfer request of the display data from the display RAM to the display while the oscillation is stopped, and stops the oscillation when it receives the access request from the CPU during the oscillation, and resumes oscillation again when the access request is canceled (stopped).

Although the present invention has been described in terms of the preferred embodiments, it will be appreciated that various modifications and alterations might be made by those skilled in the art without departing from the spirit and scope of the invention. The invention should therefore be measured in terms of the claims which follow.

What is claimed is:

1. A display control circuit incorporating a random access memory in which a display data is stored, comprising:

an oscillation circuit which oscillates a reference clock to define a transfer period in which the display data is transferred from the random access memory to a display;

a counter circuit which counts the number of the reference clocks;

wherein the transfer period is determined by the number of counts of the reference clocks by the counter circuit;

wherein the oscillation circuit comprises:

a first oscillation circuit which starts an oscillation when a transfer request of the display data from the random access memory to the display is generated while the oscillation is stopped, and stops the oscillation when an access request to the random access memory is generated from the CPU or when the counter circuit counts a predetermined number of the reference clocks during the oscillation;

a second oscillation circuit which starts an oscillation when the access request is stopped while the oscillation is stopped, and stops the oscillation when the counter circuit counts a predetermined number of the reference clocks during the oscillation; and the reference clock is generated by being oscillated by either one of the first oscillation circuit or the second oscillation circuit.

2. The display control circuit according to claim 1, wherein the oscillation circuit starts an oscillation when a transfer request of the display data from the random access memory to the display is generated while the oscillation is stopped, and stops the oscillation when an access request to the random access memory is generated from the CPU during the oscillation, and resumes the oscillation when the access request is stopped.

3. The display control circuit according to claim 1, wherein the oscillation circuit comprises a delay circuit.

4. The display control circuit according to claim 1, wherein the oscillation circuit comprises a ring oscillator circuit.

5. The display control circuit according to claim 1, which stops an output of a transfer command signal when an access request to the random access memory is generated from CPU while the transfer command signal of the display data from the random access memory to the display is outputted, and resumes the output of the transfer command signal after the access request is stopped.

6. The display control circuit according to claim 1, which outputs a transfer command signal of the display data from the random access memory to the display after an access request is stopped in a case where a transfer request of the display data from the random access memory to the display is generated while the access request to the random access memory is inputted from CPU.

* * * * *